(12) United States Patent
Chun

(10) Patent No.: US 9,098,275 B2
(45) Date of Patent: Aug. 4, 2015

(54) METHOD AND DEVICE FOR CONTROLLING POWER OF MOBILE TERMINAL

(75) Inventor: Young Soo Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 674 days.

(21) Appl. No.: 12/968,701

(22) Filed: Dec. 15, 2010

(65) Prior Publication Data

US 2011/0145762 A1 Jun. 16, 2011

(30) Foreign Application Priority Data

Dec. 15, 2009 (KR) ........................ 10-2009-0124846

(51) Int. Cl.
*G06F 1/00* (2006.01)
*G06F 1/32* (2006.01)

(52) U.S. Cl.
CPC ............ *G06F 1/3203* (2013.01); *G06F 1/3246* (2013.01); *G06F 1/3287* (2013.01); *Y02B 60/1282* (2013.01)

(58) Field of Classification Search
None
See application file for complete search history.

(56) References Cited

U.S. PATENT DOCUMENTS

| | | | | |
|---|---|---|---|---|
| 5,539,925 A * | 7/1996 | Yli-Kotila et al. | ........... | 340/7.36 |
| 5,991,883 A * | 11/1999 | Atkinson | ....................... | 713/300 |
| 6,075,925 A * | 6/2000 | Downing et al. | ............... | 358/1.1 |
| 6,504,534 B1 * | 1/2003 | Takase et al. | .................. | 345/211 |
| 6,819,961 B2 * | 11/2004 | Jacobs et al. | ..................... | 700/17 |
| 7,898,500 B2 * | 3/2011 | Fuller et al. | .................... | 345/1.1 |
| 2001/0020940 A1 * | 9/2001 | Nakazato et al. | ............. | 345/418 |
| 2003/0003972 A1 * | 1/2003 | Sabat | ............................ | 455/574 |
| 2004/0150661 A1 * | 8/2004 | Park et al. | ...................... | 345/700 |
| 2005/0282573 A1 * | 12/2005 | Maeno | .......................... | 455/522 |
| 2007/0006162 A1 * | 1/2007 | Iho | ................................. | 717/127 |
| 2008/0043656 A1 * | 2/2008 | Yoon et al. | ..................... | 370/311 |
| 2008/0218183 A1 * | 9/2008 | Sato | ............................... | 324/686 |
| 2009/0258638 A1 * | 10/2009 | Lee | ................................. | 455/418 |
| 2009/0280872 A1 * | 11/2009 | Kajiya et al. | ................... | 455/574 |
| 2010/0167787 A1 * | 7/2010 | Weisbrod | ....................... | 455/566 |
| 2010/0180228 A1 * | 7/2010 | Ben-Harrush et al. | ........ | 715/803 |
| 2010/0208636 A1 * | 8/2010 | Kim et al. | ...................... | 370/311 |
| 2011/0055434 A1 * | 3/2011 | Pyers et al. | ...................... | 710/14 |
| 2011/0128865 A1 * | 6/2011 | Doppler et al. | ............... | 370/252 |

* cited by examiner

*Primary Examiner* — Stephen Alvesteffer
(74) *Attorney, Agent, or Firm* — Jefferson IP Law, LLP

(57) ABSTRACT

A method and a device for controlling power of a mobile terminal are provided. The method of controlling power of a mobile terminal includes, activating a low power mode, and applying a predefined setting value for reducing power consumption by limiting some functions of the mobile terminal in the low power mode. Therefore, by providing a low power mode of limiting some functions of the mobile terminal, unnecessary battery consumption can be prevented.

18 Claims, 4 Drawing Sheets

METHOD AND DEVICE FOR CONTROLLING POWER OF MOBILE TERMINAL

PRIORITY

This application claims the benefit under 35 U.S.C. §119(a) of a Korean patent application filed on Dec. 15, 2009 in the Korean Intellectual Property Office and assigned Serial No. 10-2009-0124846, the entire disclosure of which is hereby incorporated by reference.

BACKGROUND OF THE INVENTION

1. Field of the Invention

The present invention relates to a method and a device for controlling power of a mobile terminal. More particularly, the present invention relates to a method and a device for controlling power of a mobile terminal that can reduce power consumption of a high performance mobile terminal.

2. Description of the Related Art

With rapid technology development, mobile terminals, in addition to an audio dedicated communication function, provide various additional functions such as a character message transmitting and receiving function, an image photographing function, a music reproduction function, a digital broadcasting service function, an Electronic-mail (E-mail) service function, and an instant messenger service function. More particularly, as a multimedia function is becoming more important, a size of the mobile terminal's display unit is increasing. Further, high performance mobile terminals are increasingly being included with an Active Matrix Organic Light Emitting Diode (AMOLED) in which a contrast ratio, a luminance, a viewing angle, a response speed, and color representation are improved, a Wi-Fi module for providing a wireless Internet service, and a Global Positioning System (GPS) module for a position search service. However, a high performance mobile terminal having the above-described various functions has a problem of large power consumption. Accordingly, a method of reducing power consumption in a high performance mobile terminal is desired.

Therefore, a need exists for a method and a device for controlling power of a mobile terminal having a low power mode that can reduce power consumption by limiting some functions of a high performance mobile terminal.

SUMMARY OF THE INVENTION

An aspect of the present invention is to address at least the above-mentioned problems and/or disadvantages and to provide at least the advantages described below. Accordingly, an aspect of the present invention is to provide a method and a device for controlling power of a mobile terminal having a low power mode that can reduce power consumption by limiting some functions of a high performance mobile terminal.

Another aspect of the present invention is to provide a method and a device for controlling power of a mobile terminal that can execute a low power mode with ease.

Still another aspect of the present invention is to provide a method and a device for controlling power of a mobile terminal that enables a user to set a limited function in a low power mode.

In accordance with an aspect of the present invention, a method of controlling power of a mobile terminal is provided. The method includes, activating a low power mode, and applying a predefined setting value for reducing power consumption by limiting some functions of the mobile terminal in the low power mode.

In accordance with another aspect of the present invention, a power control device of a mobile terminal is provided. The device includes an input unit for inputting a low power mode activation signal and for limiting some functions of the mobile terminal, and a controller for applying a predefined setting value and for reducing power consumption by limiting some functions of the mobile terminal when the low power mode is activated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
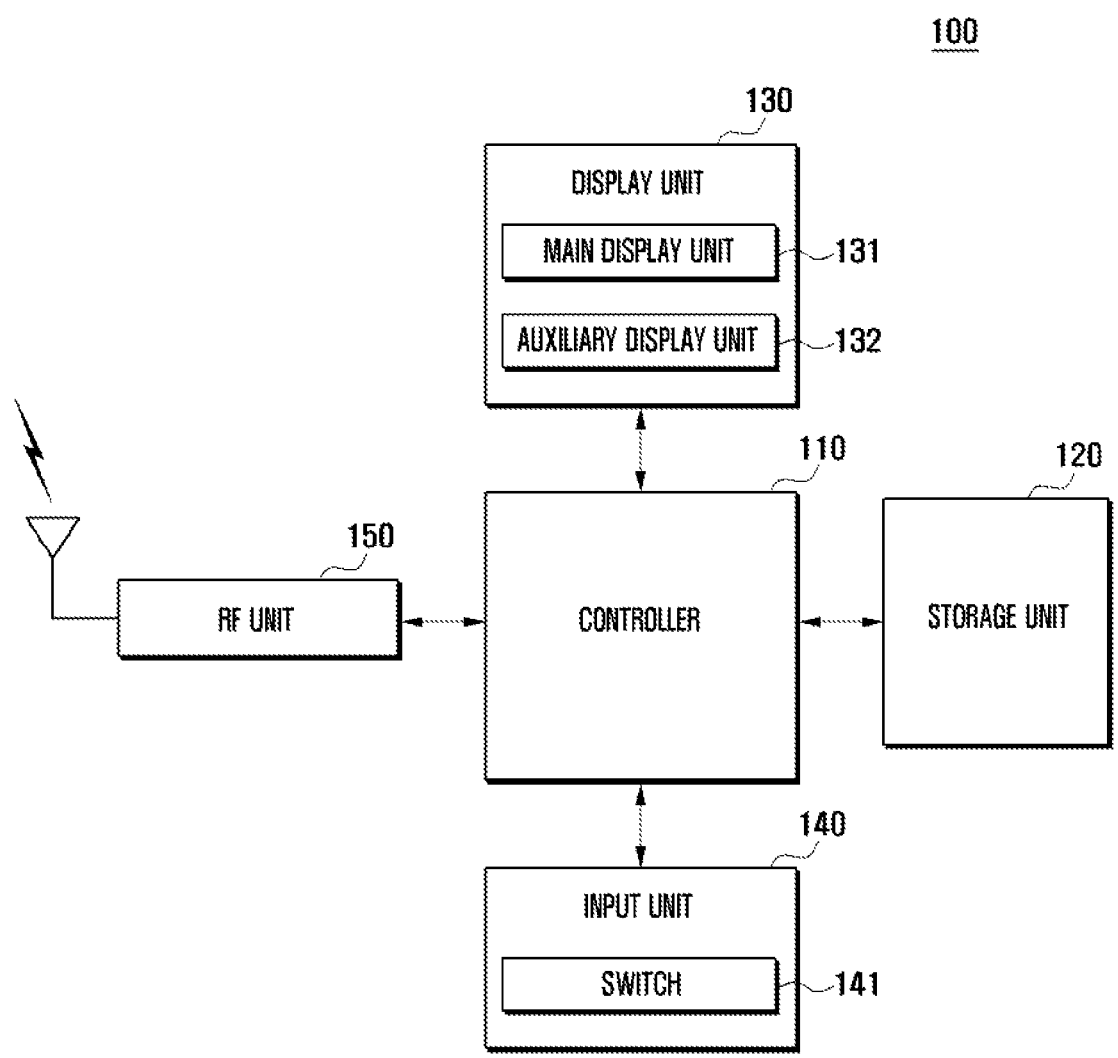
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments of the present invention may be embodied in many different forms, specific embodiments of the present invention are shown in the drawings and are described herein, with the understanding that the present disclosure is to be considered as an exemplification of the principles of the invention and is not intended to limit the invention to the specific embodiments illustrated.

Exemplary embodiments of the present invention provide a high performance mobile terminal including a mobile communication terminal, a Personal Digital Assistant (PDA), a smart phone, and a Portable Multimedia Player (PMP), and for convenience of description, these devices are referred to as a mobile terminal.

Hereinafter, a "low power mode" is a mode of reducing power consumption of a mobile terminal further than in a general use environment by limiting some functions of the mobile terminal. The low power mode includes a minimum power mode of applying a setting value provided as a default when manufacturing a mobile terminal and a user power mode of applying a setting value that is set and stored by a user.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a configuration of a mobile terminal according to an exemplary embodiment of the present invention.

Referring to FIG. 1, a mobile terminal 100 includes a controller 110, a storage unit 120, a display unit 130, an input unit 140, and a Radio Frequency (RF) unit 150. The display unit 130 includes a main display unit 131 and an auxiliary display unit 132, and the input unit 140 includes a switch 141.

The RF unit 150 transmits and receives a wireless signal to and from a mobile communication network (hereinafter, a base station) and includes a transmitting and receiving separation unit (not shown) for separating a transmitting and receiving signal. The RF unit 150 further includes an RF transmitter (not shown) for up-converting a frequency of a transmitting signal and for amplifying the signal and an RF receiver (not shown) for low-noise amplifying a receiving signal and for down-converting a frequency of the signal. More particularly, in the present exemplary embodiment, the RF unit 150 transmits a message to the base station notifying that a request for audiovisual communication cannot be received, when a low power mode is activated by the control of the controller 110.

The display unit 130 displays various menu screens of the mobile terminal 100, user data input by a user, and function setting information or various information provided to the user. The display unit 130 outputs, for example, a booting screen, a standby screen, a menu screen, and an audiovisual communication screen. The display unit 130 is formed as a Liquid Crystal Display (LCD), an Organic Light Emitting Diode (OLED), and an Active Matrix Organic Light Emitting Diode (AMOLED). Further, when the display unit 130 is formed as a touch screen, the display unit 130 can be operated as the input unit 140. More particularly, in the present exemplary embodiment, the display unit 130 outputs a user power management menu screen for setting a limited function when a user power mode is activated. A further description thereof is provided with reference to FIG. 4. As indicated above, the display unit 130 includes the main display unit 131 and the auxiliary display unit 132.

The main display unit 131 has a relatively large size, for example, 3 inches. Further, the main display unit 131 is formed as an AMOLED having power consumption greater than that of an LCD. The main display unit 131 is inactivated in a low power mode. Alternatively, the main display unit 131 may be driven in minimum brightness or a brightness that is set by a user for a low power mode.

The auxiliary display unit 132 has a relatively small size, for example, 1 inch or less and is formed as an LCD having small power consumption. The auxiliary display unit 132 may be formed as a black-and-white LCD for displaying a character. The auxiliary display unit 132 is activated in a minimum power mode and may be activated in a user power mode according to a user selection.

The input unit 140 is used for inputting numerals or various character information and includes an input key and a function key for setting various functions and for controlling a function of the mobile terminal 100. The input unit 140 includes, for example an audio dedicated communication key for requesting audio dedicated communication, an audiovisual communication key for requesting audiovisual communication, a termination key for requesting audio dedicated communication termination or audiovisual communication termination, and a volume key for adjusting an output volume of an audio signal. The input unit 140 is formed as one or a combination of input devices such as a touch-pad, a touch-screen, a key array of button type keypad, and a QWERTY button type keypad according to a form of the mobile terminal 100. As indicated above, the input unit 140 includes the switch 141.

The switch 141 activates a low power mode. Such a switch is mounted at the outside of the mobile terminal 100 for executing a low power mode without a separate manipulation. The switch 141 is formed as a three-stage switch in order to classify a normal mode, a minimum power mode, and a user power mode. For example, the switch 141 may be formed as a toggle switch and a sliding switch operating in 3 stages. A description of the normal mode, the minimum power mode, and the user power mode is provided in reference to the controller 110.

The storage unit 120 stores an application program necessary for an Operating System (OS) and other optional functions such as a sound reproduction function, an image or a moving picture reproduction function, and a broadcasting reproduction function of the mobile terminal 100, user data, and data transmitted and received when performing communication. More particularly, in the present exemplary embodiment, the storage unit 120 stores a setting value (hereinafter, a minimum power mode setting value) applied to the mobile terminal 100 in a minimum power mode. Further, the storage unit 120 stores a setting value (hereinafter, a user power mode setting value) applied to the mobile terminal 100 when a user power mode is activated. For this, the storage unit 120 stores a user power management menu.

The setting value is data for storing a limited function in a low power mode and includes a setting value of a device in which power is interrupted, for example a camera module, a Light Emitting Diode (LED) of a keypad, a Wi-Fi module, a Wibro module, a Global Positioning System (GPS) module, and a touch sensor module and a setting value of a limited function (e.g., audiovisual communication and multimedia (moving picture and music) reproduction). Further, the setting value includes brightness of the display unit 130, a ringtone volume, a communication volume, and a base station search period.

The storage unit 120 stores time information that is set to activate a low power mode. Further, the storage unit 120 stores a critical value (e.g., 3.3V) of a battery voltage for driving a minimum power mode. Further, the storage unit 120 divides a residual quantity of a battery, i.e., a battery voltage, into a plurality of levels and stores battery level mapping information in which a function limited based on a battery level is differently mapped. For example, the storage unit 120 is set to operate in a minimum power mode of a first level in which a battery voltage is 3.3V or less, in a user power mode of a second level in which a battery voltage is more than 3.3V to 3.8V or less, and in a normal mode of a third level in which a battery voltage is more than 3.8V. However, an exemplary embodiment of the present invention is not limited thereto. That is, in the present exemplary embodiment, a battery level is divided into 3 levels or more, and a function limited based on each battery level is differently set.

The controller 110 controls operations of the mobile terminal 100 and signal flow between units of the mobile terminal 100 and has a function of a data processor for processing data transmitted and received through the RF unit 150. More particularly, in the present exemplary embodiment, the controller 110 applies a predefined setting value according to a power mode (normal mode, minimum power mode, and user power mode) of the mobile terminal 100 to the mobile terminal 100. The setting value is data for storing a limited function in a low power mode.

In this case, the normal mode uses the mobile terminal 100 in general use environment. That is, in the normal mode, a user can freely use the mobile terminal 100 without a function limitation.

The minimum power mode minimizes battery power consumption by limiting all functions of the mobile terminal 100, except for a reception function (a communication request and a character message). For example, when the minimum power mode is activated, the controller 110 interrupts power to be supplied to the display unit 130. That is, the controller 110 inactivates a power supply unit (not shown) for supplying power to the display unit 130. Further, the controller 110 controls to interrupt power to be supplied to an LED of a keypad, a camera module (not shown), a Wi-Fi module (not shown), a Wibro module (not shown), a touch sensor module (not shown), and a Bluetooth module (not shown). Further, the controller 110 limits a specific function such as audiovisual communication, multimedia reproduction, and digital broadcasting reproduction. In this case, when an audiovisual communication function having large power consumption is limited, the controller 110 controls the RF unit 150 to transmit a message notifying that audiovisual communication is limited to the base station. Accordingly, the mobile terminal 100 can notify another party's terminal requesting audiovisual communication that audiovisual communication cannot be performed. As described above, when the display unit 130 of the mobile terminal 100 includes a main display unit 131 and an auxiliary display unit 132, power of the auxiliary display unit 132 having small power consumption may not be interrupted in a minimum power mode.

The user power mode reduces power consumption by limiting only a function of the mobile terminal 100 that is set by a user through a user power management menu stored in the storage unit 120. Accordingly, a minimum function requested by a user can be provided and power consumption can be reduced.

The controller 110 controls to activate a low power mode by periodically monitoring a time. That is, the controller 110 drives the mobile terminal 100 in a low power mode (a minimum power mode and a user power mode) for a predefined driving time period by determining a low power mode driving time.

The controller 110 determines a battery voltage, and when the battery voltage is a predefined critical value (e.g., 3.3V) or less, the controller 110 drives the mobile terminal 100 in a minimum power mode. Further, the controller 110 determines a battery level divided into a plurality of levels and limits a function of the mobile terminal 100 based on battery level mapping information mapped according to the battery level and stored in the storage unit 120.

Although not shown, the mobile terminal 100 may further include constituent elements having additional functions, such as a camera module for photographing an image or a moving picture, a short range communication module for short range wireless communication, a broadcasting reception module for receiving broadcasting, a digital sound source reproduction module such as a Moving Picture Experts Group (MPEG)-1 or MPEG-2 layer-3 (MP3) module, and an Internet communication module for performing an Internet function.

Figure 2:
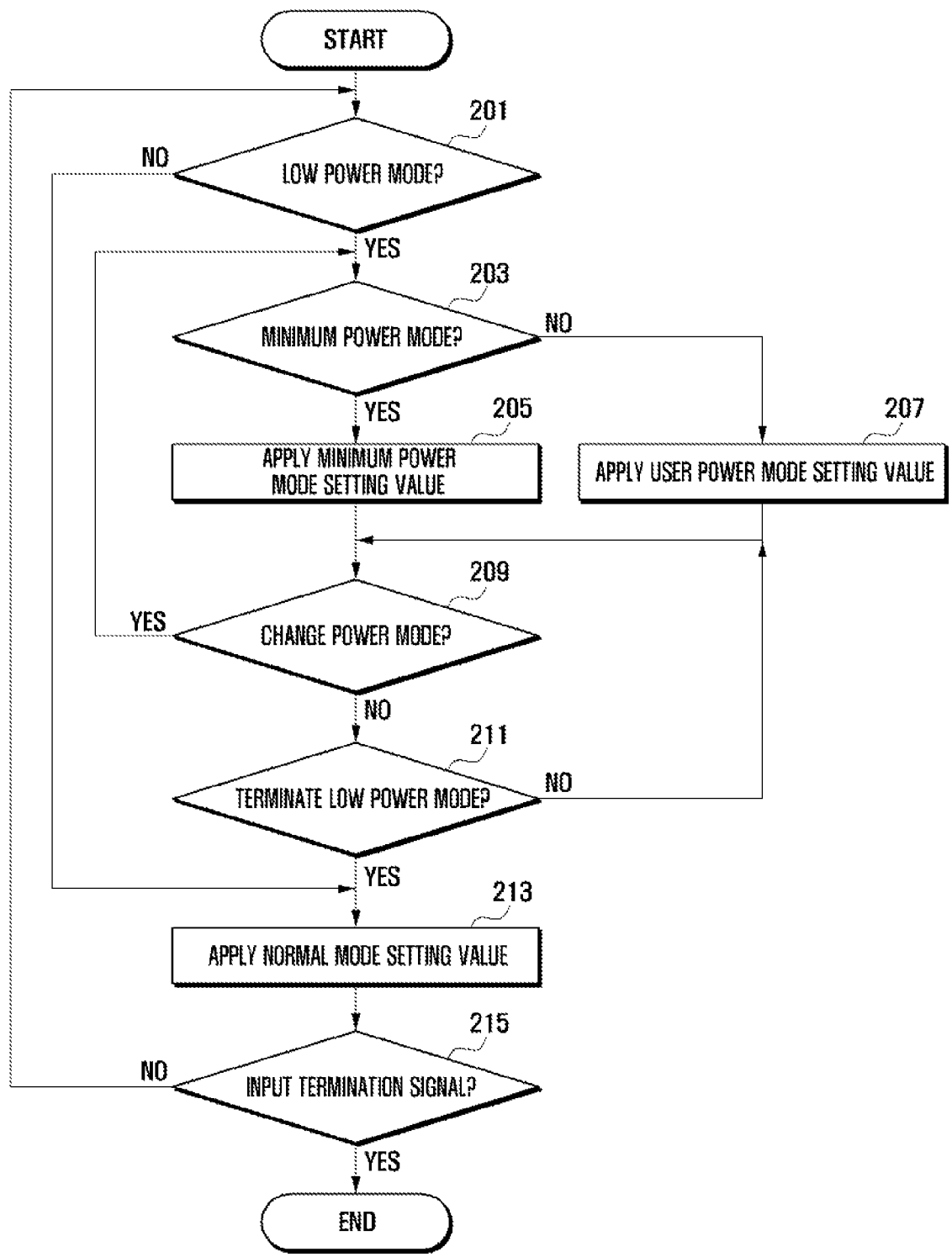
FIG. 2 is a flowchart illustrating a method of controlling power of a mobile terminal according to an exemplary embodiment of the present invention.

FIG. 2 is a flowchart illustrating a method of controlling power of a mobile terminal according to an exemplary embodiment of the present invention.

Hereinafter, it is assumed that the mobile terminal 100 is in an idle state after completing a booting process.

Referring to FIGS. 1 and 2, the controller 110 determines whether the mobile terminal 100 is in a low power mode in step 201. The low power mode is set to reduce power consumption of the mobile terminal 100 further than that in general use environment by limiting a function of the mobile terminal 100. The low power mode includes a minimum power mode of applying a minimum power mode setting value provided to a default when manufacturing the mobile terminal 100 and a user power mode of applying a user power mode setting value that is set and stored by a user. The low power mode is executed through the switch 141 mounted at the outside of the mobile terminal 100. Accordingly, a low power mode can be executed without a separate manipulation. In order to classify a normal mode, a minimum power mode, and a user power mode, the switch 141 is formed as a three-stage toggle switch or a three-stage sliding switch.

If it is determined in step 201 that the mobile terminal 100 is in the low power mode, the controller 110 then determines whether the mobile terminal 100 is in a minimum power mode in step 203.

If it is determined in step 203 that the mobile terminal 100 is in a minimum power mode, the controller 110 applies a minimum power mode setting value to the mobile terminal 100 in step 205. A description of the minimum power mode setting value has been described in FIG. 1 and therefore is omitted.

In contrast, if it is determined in step 203 that the mobile terminal 100 is not in a minimum power mode, the controller 110 applies a user power mode setting value to the mobile terminal 100 in step 207. The user power mode setting value is set by a user through a power management menu stored in the storage unit 120. A further description thereof is provided with reference to FIGS. 3 and 4.

In step 209, the controller 110 determines whether a power mode is changed.

If it is determined in step 209 that a power mode is changed, the process returns to step 203 and the above-described process is repeated. That is, the controller 110 applies a setting value according to the changed power mode to the mobile terminal 100.

In contrast, if it is determined in step 209 that a power mode is not changed, the controller 110 then determines whether a low power mode is terminated in step 211. That is, the controller 110 determines whether the mobile terminal 100 is in a normal mode.

If it is determined in step 211 that a low power mode is not terminated, the process returns to step 209 and the above-described process is repeated.

In contrast, if it is determined in step 211 that a low power mode is terminated, the controller 110 applies a normal mode setting value to the mobile terminal 100 in step 213.

In step 215, the controller 110 determines whether a termination signal is input.

If it is determined in step 215 that a termination signal is input, the controller 110 performs a termination process for turning off power of the mobile terminal 100.

In contrast, if it is determined in step 215 that a termination signal is not input, the process returns to step 201 and the above-described process is repeated.

Although not shown in FIG. 2, the controller 110 measures a voltage of a battery, and when the battery voltage is a predefined critical value (e.g., 3.3V) or less, the controller 110 controls the mobile terminal 100 to drive in a minimum power mode. Further, the controller 110 divides the battery voltage into a plurality of levels and may differently set a function limited based on a battery level. Further, the controller 110 drives the mobile terminal 100 in a low power mode of a predefined time period according to a low power mode driving time stored in the storage unit 120.

Figure 3:
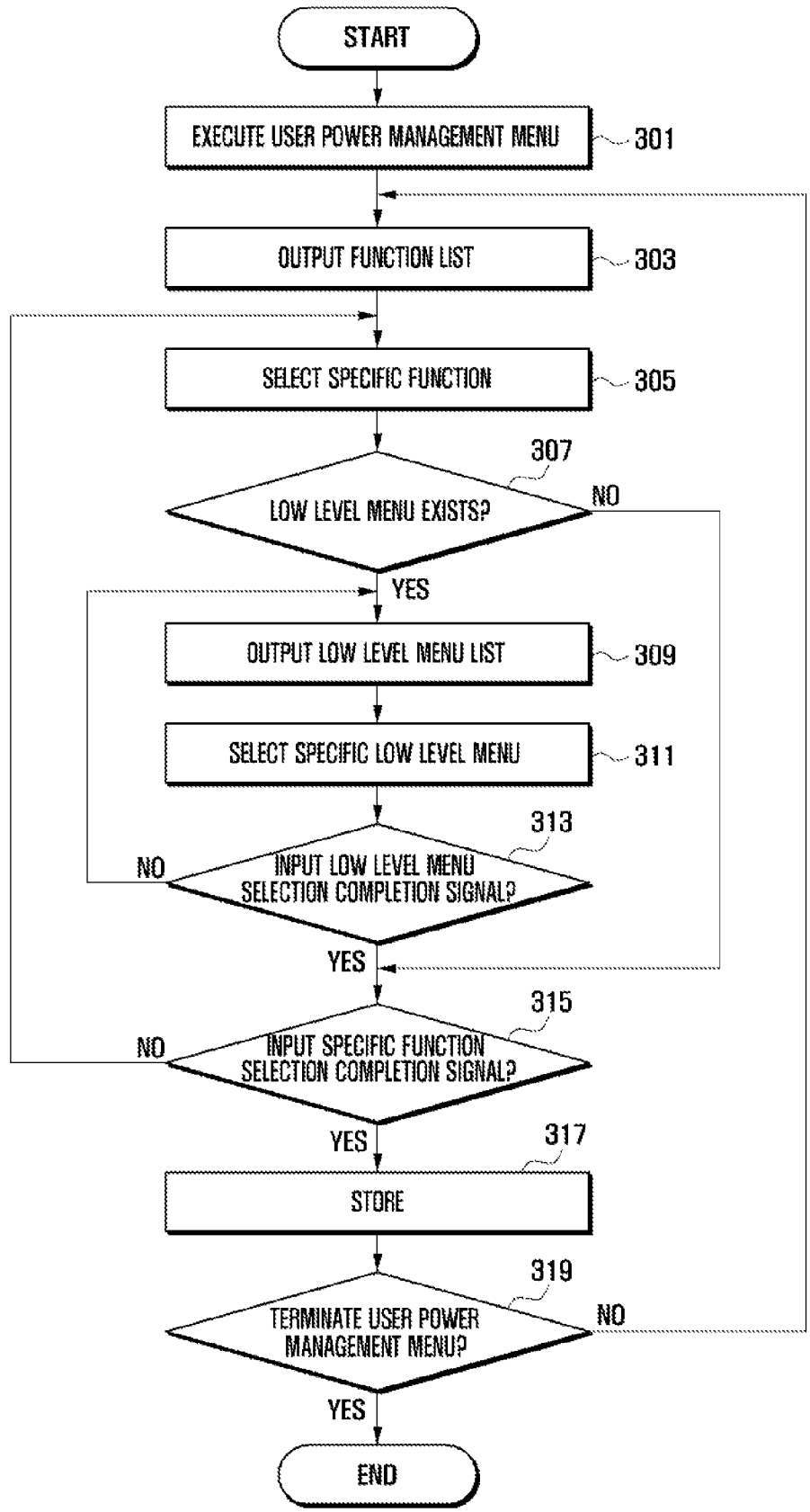
FIG. 3 is a flowchart illustrating a method of setting a user power mode setting value of a mobile terminal according to an exemplary embodiment of the present invention.
Figure 4:
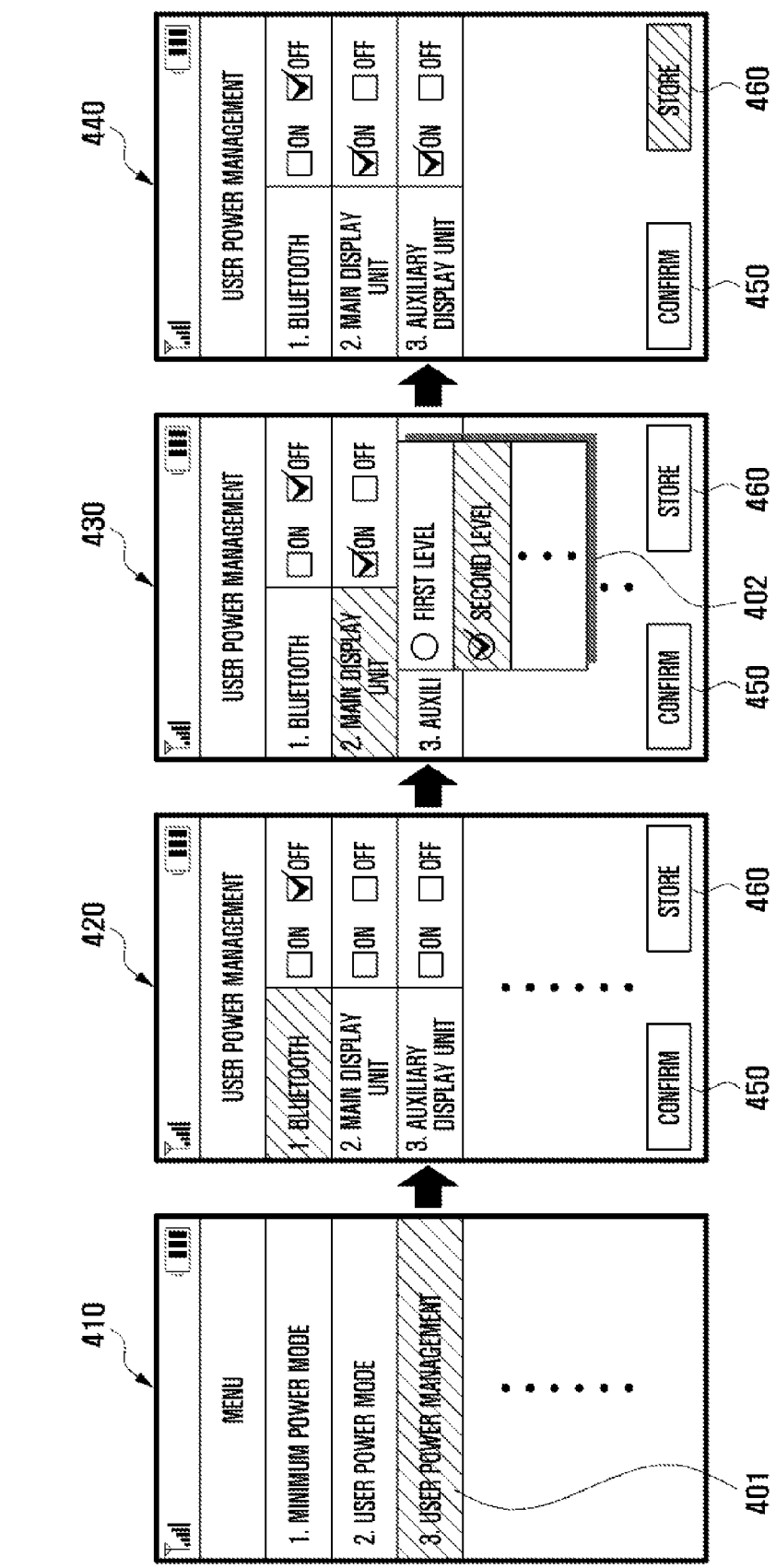
FIG. 4 illustrates examples of screens performing a method of setting a user power mode setting value of a mobile terminal according to an exemplary embodiment of the present invention.

FIG. 3 is a flowchart illustrating a method of setting a user power mode setting value of a mobile terminal, and FIG. 4 illustrates examples of screens performing a method of setting a user power mode setting value of a mobile terminal according to an exemplary embodiment of the present invention.

Referring to FIGS. 1, 3 and 4, the controller 110, according to the present exemplary embodiment, executes a user power management menu in step 301. For example, as shown in a screen 410 of FIG. 4, when a menu function is executed, a user can execute a user power management menu 401 on a menu screen output to the display unit 130 by manipulating the input unit 140. Alternatively, when the display unit 130 is formed as a touch screen, the user can execute the user power management menu 401 through a touch input.

In step 303, when the user power management menu 401 is executed, the controller 110 controls the display unit 130 to output functions provided by the mobile terminal 100 in a list form (hereinafter, a function list). For example, as shown in a screen 420 of FIG. 4, the controller 110 controls the display unit 130 to output a function list that can select on/off of specific functions (e.g., Bluetooth, a main display unit, and an auxiliary display unit).

In step 305, the controller 110 detects selection of a specific function in the function list. That is, the user can select on/off of a specific function through a manipulation of the input unit 140 or a touch input. In this case, turn-off of a specific function includes a power interruption function of a module for performing a specific function.

In step 307, the controller 110 determines whether a low level menu of the selected specific function exists.

If it is determined in step 307 that the low level menu does not exist, the process continues to step 315.

In contrast, if it is determined in step 307 that the low level menu exists, the controller 110 outputs a low level menu list to the display unit 130 in step 309. For example, as shown in a screen 430 of FIG. 4, when turn-on of the display unit 130 is selected, the controller 110 outputs a low level menu list 402 for selecting brightness of the main display unit 131 to the display unit 130.

In step 311, the controller 110 detects selection of a specific low level menu. For example, as shown in the screen 430 of FIG. 4, a user can select brightness of the main display unit 131 into two levels through a manipulation of the input unit 140 or a touch input.

In step 313, the controller 110 determines whether a low level menu selection completion signal is input. When a specific key of the input unit 140 allocated to a confirm key 450 is input, or when a touch of a confirm key area is detected, the low level menu selection completion signal occurs.

If it is determined in step 313 that the low level menu selection completion signal is not input, the process returns to step 309.

In contrast, if it is determined in step 313 that the low level menu selection completion signal is input, the controller 110 outputs a specific function selection screen to the display unit 130 and determines whether a specific function selection completion signal is input in step 315. When a touch of a store key area is detected, or when a specific key of the input unit 140 allocated to a store key 460 is input, the specific function selection completion signal occurs, as shown in a screen 440 of FIG. 4.

If it is determined in step 315 that the specific function selection completion signal is not input, the process returns to step 305.

In contrast, if it is determined in step 315 that the specific function selection completion signal is input, the controller 110 stores the selected specific function as a user power mode setting value in step 317.

In step 319, the controller 110 determines whether the user power management menu is terminated.

If it is determined in step 319 that the user power management menu is terminated, the process is terminated.

In contrast, if it is determined in step 319 that the user power management menu is not terminated, the process returns to step 303.

Although not shown in FIGS. 3 and 4, the user power management menu includes a driving time setting menu for driving a low power mode. Further, the user power management menu further includes a segment function setting menu for differently setting a function limited based on a battery level. In this case, the segment function setting menu includes a critical value setting menu for automatically driving a minimum power mode. Further, the user power management menu may further include a menu for turning on/off an automatic change function of a power mode of the mobile terminal 100 by determining the battery level.

As described above, according to an exemplary embodiment of the present invention, by providing a low power mode of limiting some functions of the mobile terminal, unnecessary battery consumption can be prevented. Further, by mounting a switch for executing a low power mode at the outside, a low power mode can be easily executed, thereby improving user convenience. Further, because a user can set a limited function in a low power mode, inconvenience due to a function limitation in a low power mode can be minimized.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of controlling power of a mobile terminal, the method comprising:
    activating a low power mode during a low power mode driving time;
    applying a predefined setting value for reducing power consumption by limiting some functions of the mobile terminal in the low power mode; and
    transmitting a message to a base station notifying that functions other than a minimum function for a communication request and character message reception cannot be performed when the low power mode is activated,
    wherein the low power mode comprises:
        a minimum power mode of operating the minimum function for the communication request and character message reception; and
        a user power mode of operating according to a setting value that is set by a user.

2. The method of claim 1, further comprising activating the minimum power mode when a battery voltage comprises a predefined critical value or less.

3. The method of claim 1, further comprising:
    storing battery level mapping information by differently setting a limited function according to a battery level divided into a plurality of levels; and
    extracting and applying the battery level mapping information corresponding to the battery level by measuring a voltage of the battery.

4. The method of claim 1, wherein a display unit outputs a user power management menu screen for setting a limited function when the user power mode is activated.

5. The method of claim 4, wherein the user power management menu comprises:
    a driving time setting menu for driving the low power mode;
    a segment function setting menu for differently setting a limited function based on a battery level, wherein the segment function setting menu includes a critical value setting menu for automatically driving the minimum power mode; and
    a menu for setting an automatic change function of a power mode of the mobile terminal based on the battery level.

6. The method of claim 1, further comprising setting the low power mode driving time for automatically activating the low power mode.

7. The method of claim 1, further comprising:
    executing a normal mode when the low power mode driving time is terminated.

8. A power control device of a mobile terminal, the power control device comprising:
    an input unit configured to input a low power mode driving time for limiting some functions of the mobile terminal; and
    a controller configured to apply a predefined setting value for reducing power consumption by limiting some functions of the mobile terminal when the low power mode is activated during the low power mode driving time; and
    a Radio Frequency (RF) unit configured to transmit a message to a base station notifying that functions other than a minimum function for a communication request and character message reception cannot be performed when the low power mode is activated,
    wherein the switch comprises a three-stage switch for selecting one of a normal mode, a minimum power mode of performing the minimum function for a reception function, and a user power mode of performing a limited function that is set by a user.

9. The power control device of claim 8, wherein the input unit comprises a switch mounted at the outside of the mobile terminal to input a low power mode activation signal.

10. The power control device of claim 9, further comprising a storage unit for storing a power management menu that sets a function to limit in the user power mode.

11. The power control device of claim 10, wherein the storage unit further stores the low power mode driving time for automatically activating the low power mode.

12. The power control device of claim 10, wherein the storage unit further stores battery level mapping information that differently sets a limited function according to a battery level divided into a plurality of levels.

13. The power control device of claim 9, wherein the controller drives the minimum power mode when a battery voltage is a predefined critical value or less.

14. The power control device of claim 9, further comprising:
    a main display unit configured:
        to turn on power in the normal mode and for turning off power in the minimum power mod; and
        to selectively turn off power in the user power mode, and having relatively large power consumption; and
    an auxiliary display unit configured to be driven in the minimum power mode and having a size relatively smaller than the main display unit and having small power consumption.

15. The power control device of claim 14, wherein the main display unit and the auxiliary display unit output the power management menu screen for setting a limited function when the user power mode is activated.

16. The power control device of claim 15, wherein the power management menu comprises:
    a driving time setting menu configured to drive the low power mode;
    a segment function setting menu configured to differently set a limited function based on a battery level, wherein the segment function setting menu includes a critical value setting menu for automatically driving the minimum power mode; and
    a menu configured to set an automatic change function of a power mode of the mobile terminal based on the battery level.

17. The power control device of claim 8, further comprising a Radio Frequency (RF) unit for transmitting a message notifying that audiovisual communication cannot be performed in the low power mode to the base station.

18. The power control device of claim 8, wherein the controller executes a normal mode when the low power mode driving time is terminated.

* * * * *